No. 628,110. Patented July 4, 1899.
O. MUELLER.
TAPPING MACHINE.
(Application filed Apr. 1, 1899.)

(No Model.)

Attest.
Nora Graham.
Ina Graham.

INVENTOR
OSCAR MUELLER
by L. P. Graham
his attorney

THE NORRIS PETERS CO., PHOTO-LITHO., WASHINGTON, D. C.

United States Patent Office.

OSCAR MUELLER, OF DECATUR, ILLINOIS.

TAPPING-MACHINE.

SPECIFICATION forming part of Letters Patent No. 628,110, dated July 4, 1899.

Application filed April 1, 1899. Serial No. 711,461. (No model.)

*To all whom it may concern:*

Be it known that I, OSCAR MUELLER, of the city of Decatur, county of Macon, and State of Illinois, have invented a certain Improved Tapping-Machine, of which the following is a specification.

This invention is intended to provide a cheap and superior substitute for the old-style "crow-hook" dry-pipe and gas tapping machine. It is set forth in detail in the following specification and it is defined in the appended claim.

Figure 1:
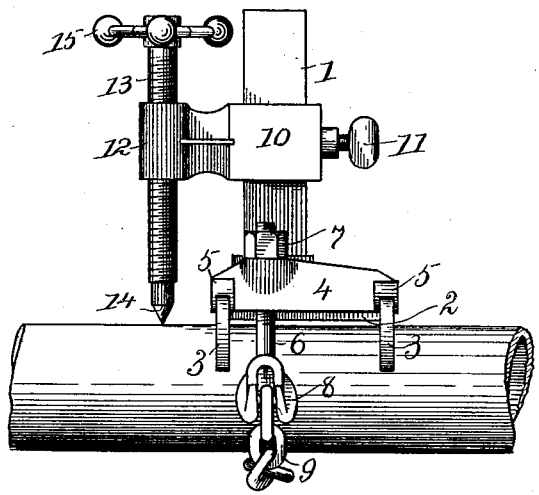
Figure 2:
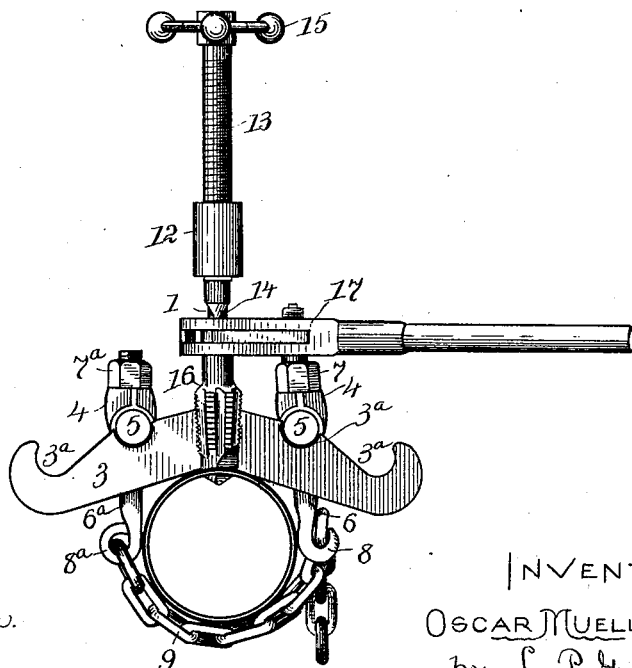

In the drawings forming part of this specification, Figure 1 is a side view of a tapping-machine constructed in accordance with my invention, the tap and drill and ratchet-wrench being omitted. Fig. 2 is an end view of the machine with the tap and drill and ratchet-wrench in place.

To construct my machine, a pair of saddle-bars 3 are made with obtuse angles in their under or inner edges and concave notches 3ª in their upper or outer edges. These saddles are connected by a bar 2, (seen only in Fig. 1,) and from the connecting-bar extends a prismatic guide-bar 1. A pair of rock-bars 4 have rounded ends 5, which rest in the circular notches 3ª of the saddle-bars, and they are bored transversely between their ends to receive bolts 6 and 6ª, respectively. The bolt 6ª has an eye 8ª, to which a chain 9 is attached, and the other bolt has a claw 8, adapted to engage a link of the chain. Nuts 7 and 7ª are used to hold the bolts in the rock-bars and to tighten the chain against the pipe to be tapped. An arm 10 is mounted slidably on guide-bar 1, at right angles therewith, and it is held in any desired position on the guide-bar by a set-screw 11. On the extended end of the arm is a head 12, which is bored parallel with bar 1 and screw-threaded, and a feed-screw 13, with a tapered engaging end 14 and a finger-wheel 15, is screwed through the head.

The frame is attached to the pipe to be tapped by setting the saddle-bars against the pipe, passing the chain around the pipe and connecting it with the claw, and then tightening nuts 7 and 7ª to the required extent. When this is done, the guide-bar is secured firmly in position with the feed-screw pointing toward the center of the pipe at the point the tap is to be made. The feed-screw may then be screwed down until its point comes in contact with the pipe, as shown in Fig. 1, or the arm may be slid down on the guide-bar to accomplish the same result. At the place of contact of the screw-point with the pipe an indentation may be made, and after the screw is drawn back sufficiently a tapping-tool is placed with its point in the indentation and its opposite end under the screw, and the drilling and tapping are done in the usual manner, except for the increased precision attendant on proper starting of the tapping-tool. The adjustment of the arm on the guide-bar enables the operator to use a tapping-tool of any length he may chance to have handy, and a further advantage over the old-style "crow-hook" results from the fact that the bearing of the saddle against the pipe is on the same side of the pipe that the tap is to be made instead of the opposite side, and that in consequence thereof the machine is brought more precisely into alinement with the center of the pipe.

The prismatic conformation of the guide-bar prevents the arm from turning out of line with the indentation made by the point of the feed-screw when the arm and the screw are raised to receive the drill.

What I claim is—

A tapping-machine comprising a prismatic guide-bar having a saddle to sit against a pipe and hold the bar at right angles therewith, means for fastening the saddle to the pipe, an arm on the guide-bar slidably adjustable the entire length thereof, a head on the arm having a threaded bore parallel with the guide-bar and a feed-screw in the head having a pointed end, substantially as described.

In testimony whereof I sign my name in the presence of two subscribing witnesses.

OSCAR MUELLER.

Witnesses:
BARNA MCDANIEL,
MABEL CARSON.